United States Patent Office 3,045,175
Patented July 17, 1962

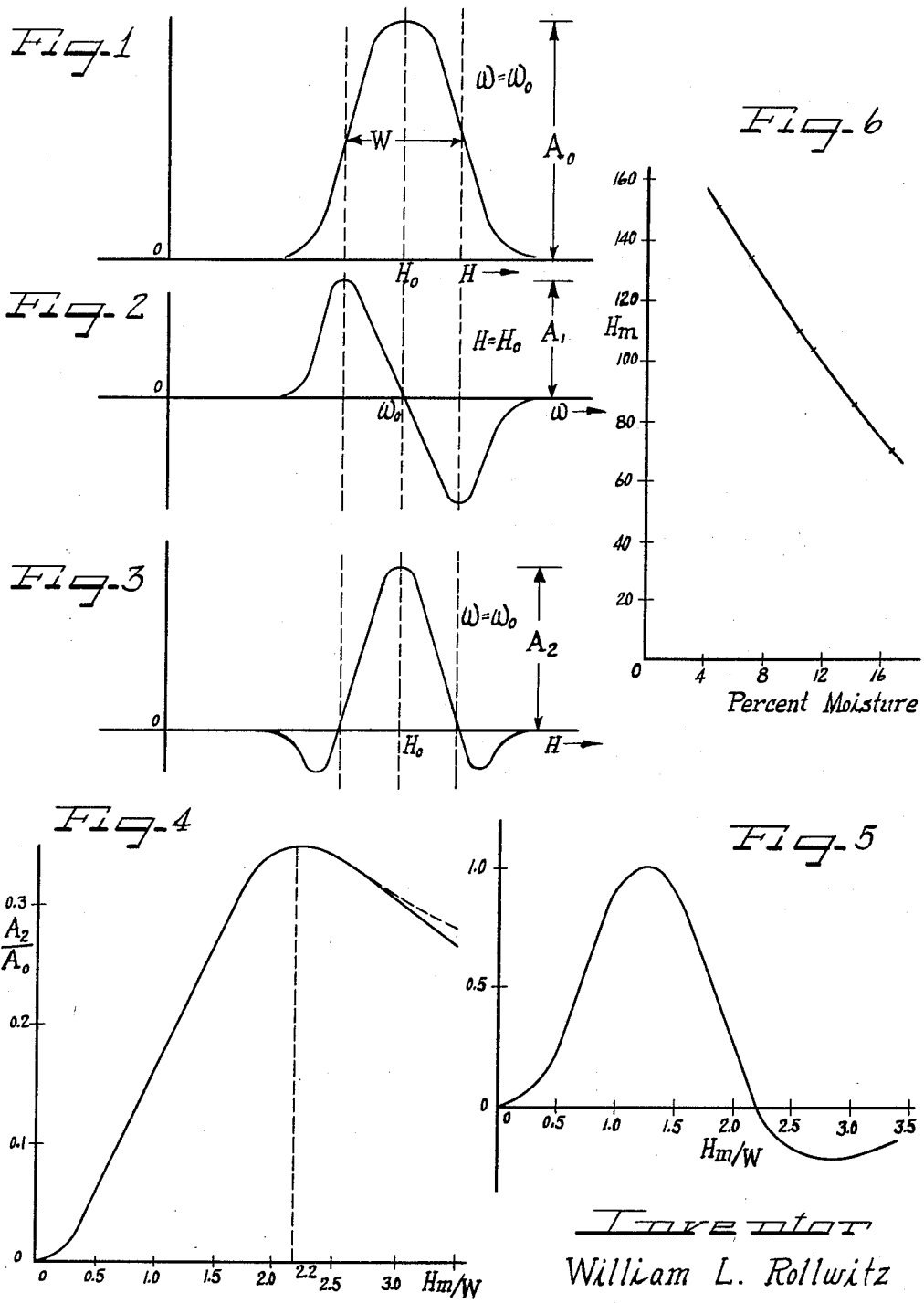

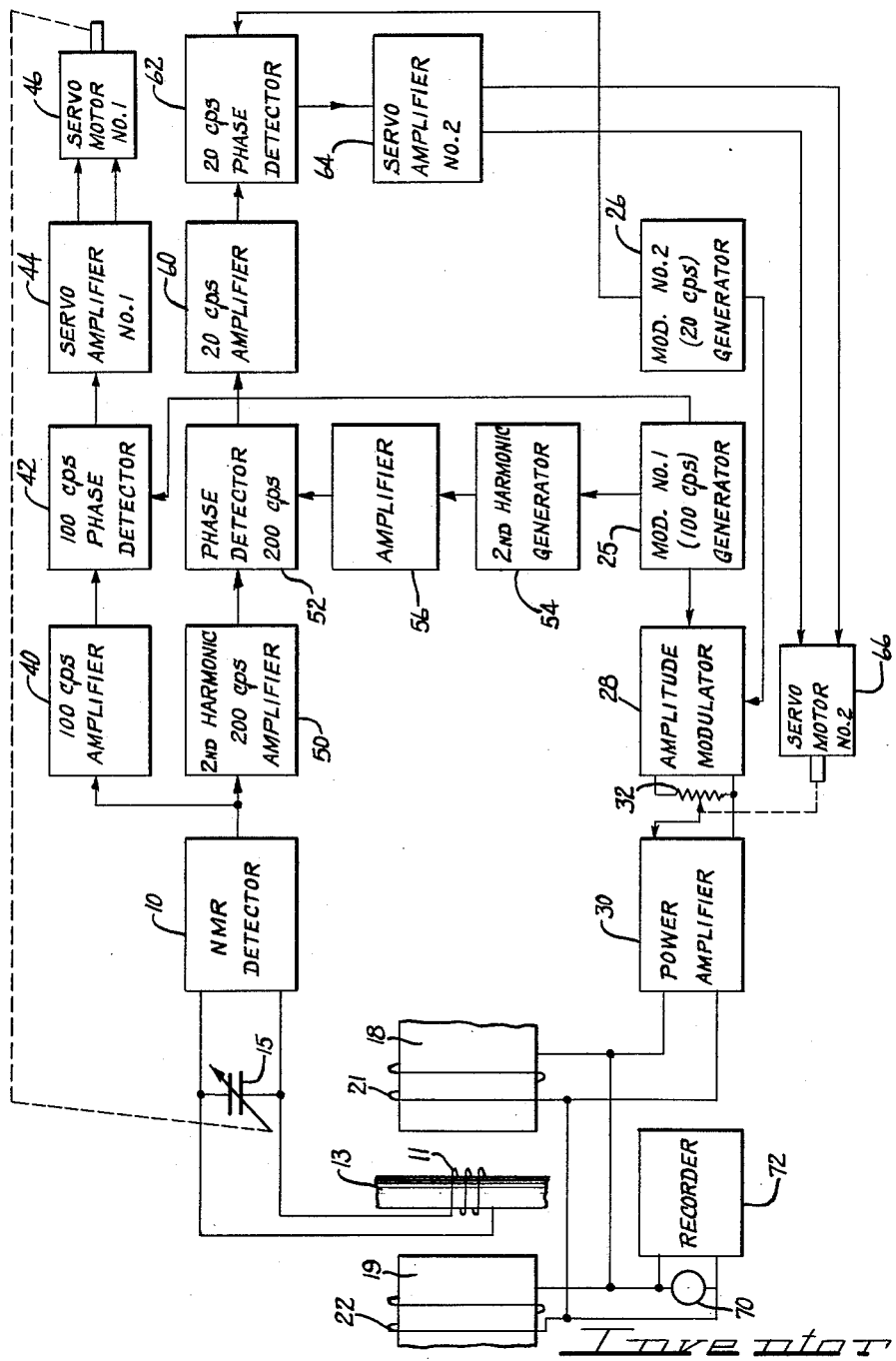

3,045,175
SECOND-HARMONIC MOISTURE METER FOR
CONTINUOUS FLOW
William L. Rollwitz, San Antonio, Tex., assignor to Corn
Industries Research Foundation, Inc., Washington,
D.C., a corporation of Indiana
Filed Dec. 16, 1958, Ser. No. 780,889
7 Claims. (Cl. 324—.5)

The present invention is directed to a method of and apparatus for making quantitative measure of magnetic absorption and, more specifically, is directed to a method and apparatus for determining physical and/or chemical properties of matter by the utilization of nuclear magnetic resonance measurements in a non-destructive analysis.

The principles of nuclear magnetic resonance are discussed in a previous application of Garren, Rollwitz and Shaw, U.S. Serial No. 626,020, filed December 3, 1956, and entitled "Continuous Flow Measurements by Nuclear Magnetic Resonance," and the discussion in said application is specifically referred to and incorporated herein.

An object of the present invention is to provide an improved method and apparatus for the non-destructive analysis of materials for specific nuclei.

Another object of the present invention is to provide a method and apparatus for the measurement of moisture content or the like which will be substantially independent of the volume of the sample within predetermined limits.

A further object of the invention is to provide an improved method and apparatus for quantitative analysis of materials on a continuous flow basis.

Still another object of the invention is to provide an apparatus for measuring nuclear magnetic resonance effects having great simplicity and requiring no special skills on the part of the operator.

It is also an object of the invention to provide an improved method and apparatus for the non-destructive analysis of materials for specific nuclei wherein no special preparation or weighing is required.

A still further object of the invention is to provide a method and apparatus for determining moisture content wherein the moisture measurement is almost instantaneous.

Yet another object of the invention is to provide an apparatus for the quantitative analysis of materials having a very high degree of accuracy.

In an embodiment of the present invention, a detection system is arranged to continuously maintain a required condition of resonance. A further system is provided to adjust the amplitude of the modulating magnetic field superimposed on the polarizing unidirectional magnetic field so as to continually maintain the amplitude of the second harmonic component of the output signal at a maximum. It is found, for example, that the amplitude of the modulating magnetic field required to maximize the second harmonic component of the output signal is proportional to the moisture content of the sample disposed in the magnetic field. Since no amplitudes are measured from the absorption curve, but only the modulation amplitude required to give the maximum of the peak second harmonic, the measurement will be independent of the amount of sample in the sample coil so long as there is a sufficient signal to produce proper operation of the system.

A further description of the present invention will be made in conjunction with the attached drawings, in which:

FIGURE 1 represents the waveform of the nuclear magnetic resonance absorption signal as a function of the intensity of the magnetic polarizing field with the nuclear magnetic resonance detector tuned to the resonance absorption frequency;

FIGURE 2 may be described as a plot of the amplitude of the fundamental sine wave component of the nuclear magnetic resonance absorption signal as a function of the angular frequency to which the nuclear magnetic resonance detector is tuned;

FIGURE 3 represents a plot of the amplitude of the second harmonic component of the absorption signal as a function of the applied polarizing field;

FIGURE 4 represents a graph of the ratio of the peak of the second harmonic component of the absorption signal to the peak of the absorption signal as a function of the ratio of the amplitude of the polarizing field modulation to the width of the absorption curve;

FIGURE 5 is a plot of the amplitude of a submodulation component of the absorption signal resulting from the modulation of the polarizing field modulation as a function of the ratio of the amplitude of the polarizing field modulation to the width of the absorption curve;

FIGURE 6 is a plot of the modulation amplitude providing the maximum of the second harmonic component of the absorption signal as a function of moisture content for starch; and FIGURE 7 is a block diagram of a moisture meter in accordance with the present invention.

As shown on the drawings:

The nuclear magnetic resonance absorption signal amplitude as a function of magnetic field strength, H, is plotted in FIGURE 1. A similar curve would represent the absorption signal amplitude as a function of angular frequency, $\omega$. Since the resonance absorption occurs at a frequency and magnetic field strength for a certain nucleus according to the relation, $\omega_0 = \gamma H_0$, either the angular frequency, $\omega$, or the magnetic field strength, H, may be varied to display the absorption curve where $\gamma$ is a constant of the nuclear species called the gyromagnetic ratio.

The magnetic field ordinarily is made to contain three components: one, a steady magnetic field $H_0$, two, a sinusoidal modulation $H_m \cos \omega_m t$, and three, a linearly varying sweeping field, $h(t)$. The absorption signal is thus swept by $h(t)$ and modulated by $H_m \cos \omega_m t$. The resulting signal, if $H_m$ is less than the absorption line width, W, is an A.C. signal at an angular frequency $\omega_m$, whose amplitude varies according to the slope of the absorption curve swept. The phase of the A.C. signal at frequency, $\omega_m$, will be zero for the positive slope and the 180° for the negative slope. If this A.C. signal is sent through a phase-sensitive detector, the output will be a curve similar to that illustrated in FIGURE 2. This curve is called the first harmonic or derivative curve of the absorption signal.

If the second harmonic frequency, $2\omega_m$, is detected by a phase-sensitive detector, a curve similar to that shown in FIGURE 3 is obtained. FIGURE 3 may be called the second harmonic curve of the absorption signal.

From FIGURES 1, 2 and 3, it is evident that when the absorption curve is at a maximum (at $\omega_0$ and $H_0$), the derivative or first harmonic curve is zero with a negative slope, and the second harmonic curve is at a maximum. It is therefore possible to use the first derivative curve as a control curve to lock angular frequency $\omega$ and polarizing magnetic field H to the resonance values $\omega_0$ and $H_0$. In this case, the sweeping voltage, $h(t)$, would be zero, but $H_m \cos \omega_m t$ would be a predetermined value. The voltage corresponding to the curve of FIGURE 2 from the first harmonic phase-sensitive detector would be sent to a servo amplifier driving a servo motor which would drive either a potentiometer to control the magnetic field, H, or would drive a variable capacitor to control the frequency, $\omega$. With either type of control, $\omega$ or H, when either $\omega$ or H is shifted such that the first harmonic output was a value different from zero, the servo amplifier would be given a signal which would cause the servo motor to change either $\omega$ or $H$ to the value $\omega_0$ or $H_0$. With this control, the second harmonic phase-detected output would always be at the peak.

Since the second harmonic peak amplitude is proportional to the peak amplitude of the absorption curve, and since the peak amplitude of the absorption curve is proportional to the volume density of the nuclei being measured (in the case of moisture, the nuclei being measured are the nuclei of hydrogen), the second harmonic peak amplitude can also be used to measure percentage moisture. A moisture meter based upon these principles was the subject of the previous patent application Serial No. 626,020 aforesaid.

FIGURE 4 represents a plot of the ratio of the peak amplitude of the second harmonic, $A_2$ (FIGURE 3), to the peak amplitude of the absorption curve, $A_0$ (FIGURE 1), as a function of the ratio of the modulation amplitude, $H_m$, to the width of the absorption curve, W. The curve has a maximum where the modulation amplitude, $H_m$, is 2.2 times the absorption curve width, W. It has been determined by experiment that the width of the absorption curve for moisture in starches, for example, is proportional to the percentage moisture. FIGURE 6 represents a plot of the modulation amplitude, $H_m$, required at the maximum of the second harmonic peak amplitude versus modulation amplitude curve (FIGURE 4) as a function of percentage moisture content in starch.

From the results of the curves shown in FIGURES 4 and 6, it was determined that, if the modulation amplitude, $H_m$, required at the maximum of the peak second harmonic curve of FIGURE 4 could be determined automatically, the percent moisture could be obtained from FIGURE 4. That is, if a new lock-in system could be provided which would keep the modulation amplitude, $H_m$, at the value required to give the maximum of the peak second harmonic, the moisture content could be measured by measuring the modulation amplitude, $H_m$.

FIGURE 5 illustrates a suitable error signal characteristic for maintaining the modulation amplitude, $H_m$, at the value corresponding to the maximum of the peak second harmonic curve of FIGURE 4. The characteristic of FIGURE 5 can be obtained by sinusoidally modulating the modulation field $H_m$ and phase-detecting this modulation-of-the-modulation in the output signal. The locking-in of the modulation, $H_m$, at the maximum peak second harmonic point may then be produced by feeding the error curve of FIGURE 5 into a servo amplifier driving a servo motor which in turn drives a potentiometer controlling the modulation amplitude. A meter or recorder measuring the modulation amplitude may then be calibrated to measure or record the percentage moisture according to the curve of FIGURE 6.

Since no amplitudes are measured from the absorption curve, the only measurement being the modulation amplitude, $H_m$, required to give the maximum of the peak second harmonic, the measurement will be independent of the amount of sample in the sample coil of the nuclear magnetic resonance detector so long as there is enough signal to permit the servo systems involved to act on the two error curves (FIGURES 2 and 5) and not on the noise present.

Description of FIGURE 7

FIGURE 7 illustrates a moisture meter utilizing an indication of the modulation, $H_m$, required at the maximum of the peak second harmonic signal as a measure of the percentage moisture.

In the illustrated embodiment, a suitable nuclear magnetic resonance detector is indicated at 10 having a sample coil 11, which may, for example, surround a tube 13 through which the material to be analyzed may be continuously fed by any suitable means. The detector 10 may also comprise a capacitor 15 in parallel with sample coil 11 for determining the frequency of operation of the detector 10. A polarizing field $H_0$ may be applied at right angles to the axis of coil 11 by means of a permanent magnet having poles indicated at 18 and 19, and the modulating field may be provided by means of a pair of coils 21 and 22 on the poles 18 and 19.

The absorption signal caused by the absorption of energy by the nuclei in the sample coil 11 is detected by the detector 10. The repetition rate of the absorption signal output from detector 10 is governed by the modulation frequency and in the illustrated embodiment the modulation may comprise a basic 100 cycle per second wave amplitude modulated by a 20 cycle per second wave. A modulation percentage of 30 to 50 percent is adequate. Thus, the signal output from the detector 10 is an absorption curve similar to that illustrated in FIGURE 1 at a basic repitition rate of 100 cycles per second whose amplitude is varied at a 20 cycle per second rate. The 100 cycle per second modulation signal may be provided by means of a generator indicated at 25, while the 20 cycle per second modulation may be provided by a generator such as indicated at 26. The modulation signals may be generated by Wein-Bridge oscillators. The modulation-of-the-modulation takes place in an amplitude modulator 28, and the modulation coils 21 and 22 are fed from a power amplifier 30 whose input is varied by a potentiometer 32. Therefore, the amplitude of the modulation is varied by potentiometer 32.

The output of the nuclear magnetic resonance detector 10 is split into two channels. The first channel selects out the 100 cycle per second first harmonic signal by means of a 100 cycle per second amplifier 40. The signal from the amplifier 40 is fed to a 100 cycle per second phase detector 42 which provides an output in accordance with the error curve of FIGURE 2 for servo amplifier 44. The servo amplifier 44 is of the zero-seeking type and therefore, the servo amplifier will transmit a signal to the servo motor 46 to cause the motor to turn and vary capacitor 15, thereby varying the frequency, $\omega$, of detector 10. The motor 46 will continue to turn until the frequency is equal to the frequency of absorption, $\omega_0$. At this time, the error signal will be zero and the motor 46 will stop and will continue to seek the zero point of the first harmonic error curve of FIGURE 2. This results in locking-in the frequency so that the detector 10 is always measuring the peak of the absorption curve, and thereby the peak of the second harmonic.

By way of example, the detector 10 may utilize the well-known Pound Circuit, the coil 11 and capacitor 15 comprising a tuned circuit determining the frequency of the radio frequency energy applied by the coil 11 to the sample.

The second harmonic (200 cycles per second) is selected in the second channel at the output of detector 10 by means of the 200 cycle per second amplifier 50. The 200 cycle per second signal is also modulated by the 20 cycle per second wave from generator 26, and the 20 cycle modulation signal is selected by demodulation of the 200 cycle signal through a balanced demodulator, 200 cycle phase detector 52. The phase detector 52 is illustrated as receiving a second harmonic reference signal from generator 25 through a second harmonic generator 54 and an amplifier 56. The 20 cycle per second signal is fed by means of a 20 cycle per second amplifier 60 to a 20 cycle per second phase detector 52 and the resultant error curve (corresponding to FIGURE 4) is applied to a servo amplifier 64. This servo amplifier 64 is another zero-seeking type servo amplifier and therefore, it will send a signal to servo motor 66 as long as the error signal is not zero. The servo motor 66 will in turn drive the potentiometer 32 until the maximum of the peak second harmonic is reached. At this time, the error signal is zero and the motor 66 will stop and seek a setting of potentiometer 32 such that this zero is obtained as the modulation required changes because of changes for example, in the moisture content of the material passing through tube 13 of sample coil 11.

The percent moisture is then read on the indicating meter 70 connected across the modulation coils 21 and 22 or recorded on a recorder 72 measuring this same voltage across the modulation coils.

The system of the illustrated embodiment thus provides a moisture meter which does not measure the amplitude of the absorption signal but measures only the modulation, $H_m$, required for the maximum of the peak second harmonic. The unit requires few operating controls since it is locked-in at all points by servomechanisms. The operating controls are: (1) power switch, and (2) the indicating meter and/or recorder range switch.

The moisture meter described can be used on both batch-samples and continuous-flow. On a batch-sample meter a standard sample will pop up into the sample coil 11 when the unknown sample is removed and be depressed out of the sample coil when the unknown sample is inserted in order to keep the servomechanisms locked-in. On continuous flow measurements, there should always be enough sample in the sample tube 13 of sample coil 11 to permit this locking-in.

The measurement of percentage moisture will be independent of the amount of sample as long as enough sample is present to give error signals greater than the noise. At moisture levels around 10% in starch, it is estimated that the "filling factor" can be as low as 30 percent.

The measurement requires no special skills on the part of the operator since there are only two operating controls.

The sample, on the batch sample measurement, requires no special preparation or weighing. The only requirement is that the sample contain enough material to give a signal large enough to permit locking-in.

The moisture measurement is almost instantaneous. The only time lag involved is the time required for servo motor 66 to reach the zero point of the error signal. This time lag is less than one second.

The indication is an above-zero reading on both or either the recorder 72 and meter 70, and is made from a very high signal-to-noise ratio signal. Therefore, the accuracy will be limited only by the accuracy of the meter 70 and recorder 72, and by the signal-to-noise ratio of the error signals and should be less than 0.5 percent.

Summary of Operation

The operation of the illustrated embodiment is based on the discovery that the absorption line width, W, indicated in FIGURE 1, is a function of the percentage moisture in starches, for example. It is further found as indicated in FIGURE 4 that the absorption width W is uniquely determined as a function of the modulation amplitude $H_m$ where the modulation amplitude $H_m$ is adjusted to provide a maximum of the second harmonic peak amplitude. Summarizing these findings, as illustrated in FIGURE 6, the modulation amplitude $H_m$ required to provide a maximum of the second harmonic component is a linear function of the percentage moisture for starch, for example. The system of the present invention takes advantage of these facts by continuously adjusting the modulation amplitude to provide a maximum of the second harmonic component and measuring the modulation amplitude to obtain a measure of the moisture content of the sample under consideration.

In the illustrated embodiment, the modulation signal $H_m$ is maintained at a value corresponding to maximum amplitude of the second harmonic component by means of the error waveform illustrated in FIGURE 5.

Referring to the embodiment of FIGURE 7, the material whose moisture content is to be determined is passed continuously through a tube 13 extending through a sample coil 11 of detector 10. The polarizing field provided by poles 18 and 19 of the permanent magnet is modulated by means of the 100 cycle per second signal from generator 25 which is modulated at modulator 28 by means of the 20 cycle per second generator 26. Each time the resultant magnetic field is within the resonance curve value, as shown in FIGURE 1, an output will be derived from the detector. The output of the detector, since the peak-to-peak value of the modulation is approximately 2.2 times the line width, W, is a series of approximate absorption curves tied together having a basic repetition rate of 200 cycles per second, with the amplitude of the pulses varying at the 20 cycle per second rate. The line width, W, is the width of the absorption curve of FIGURE 1 at one-half maximum amplitude.

The fundamental or first harmonic component of the absorption signal is detected by means of phase detector 42 to provide an error signal of the form indicated in FIGURE 2 for maintaining capacitor 15 tuned to the resonance frequency.

The second harmonic component of the resonance signal is fed to a phase detector 52 receiving a second harmonic reference signal from second harmonic generator 54 and then is fed to a 20 cycle per second phase detector 62 to provide an error signal of the form illustrated in FIGURE 5 for controlling servo motor 66 to maintain potentiometer 32 at a value such that the amplitude of the second harmonic component is a maximum. With the modulation amplitude $H_m$ locked-in at the value for maximum amplitude of the second harmonic component, the value of the modulation amplitude $H_m$ is a measure of the instantaneous moisture content of the material travelling through the tube 13 as represented by the graph of FIGURE 6.

It will be observed that the measurement of the modulation field by meter 70 and recorder 72 is fully automatic so long as the servomechanisms are operating properly, so that the apparatus need include only a power switch and an indicating meter and/or recorder range switch. The measurement thus requires no special skills on the part of the operator and is extremely simple.

It will be apparent that many modifications and variations can be made without departing from the scope of concepts of the present invention.

I claim as my invention:

1. An apparatus for quantitative analysis comprising a nuclear magnetic resonance detector having means for establishing a unidirectional magnetic field in a sample to be analyzed, controllable means for assuming a resonance-producing condition for causing a component of said sample to exhibit nuclear magnetic resonance and means for producing an output signal when said component of said sample exhibits nuclear magnetic resonance, means coupled to said controllable means for automatically maintaining said controllable means at said resonance producing condition, magnetic field modulating means for providing a cyclically varying modulating signal modulating said unidirectional magnetic field to cause said sample to exhibit nuclear magnetic resonance in successive cycles of said modulating signal, means for controlling the amplitude of said modulating signal to maintain the peak amplitude of a second harmonic component of the output signal at a maximum while the controllable means is maintained at resonance producing condition, and means for measuring the amplitude of the modulating signal to determine the concentration of said component in said sample.

2. An apparatus for quantitative analysis comprising a nuclear magnetic resonance detector having means for establishing a unidirectional magnetic field in a sample to be analyzed, controllable means for assuming a resonance-producing condition with respect to the strength of said unidirectional magnetic field for causing a component of said sample to exhibit nuclear magnetic resonance and means for producing an output signal when said component of said sample exhibits nuclear magnetic resonance, means coupled to said controllable means for automatically maintaining said controllable means at said resonance producing condition, magnetic field modulating means for providing a cyclically varying modulating signal modulating said unidirectional magnetic field to cause said sample to exhibit nuclear resonance in successive cycles of said modulating signal, means for modulating said modulating signal at a relatively low frequency, means responsive to the component of said output signal varying at said relatively low frequency for automatically controlling the amplitude of said modulating signal to maintain the peak amplitude of a second harmonic component of the output signal at a maximum while the controllable means is maintained at resonance producing condition, and means for measuring the amplitude of the modulating signal to determine the concentration of said component in said sample.

3. An apparatus for quantitative analysis comprising a nuclear magnetic resonance detector having means for establishing a unidirectional magnetic field in a sample to be analyzed, controllable means for assuming a resonance-producing condition with respect to the strength of said unidirectional magnetic field for causing a component of said sample to exhibit nuclear magnetic resonance and means for producing an output signal when said component of said sample exhibits nuclear magnetic resonance, means coupled to said controllable means for automatically maintaining said controllable means at said resonance producing condition, magnetic field modulating means for providing a cyclically varying modulating signal modulating said unidirectional magnetic field to thus cause said sample to exhibit nuclear magnetic resonance in successive cycles of said modulating signal, means for modulating said modulating signal at a relatively low frequency, phase-sensitive means for demodulating the component of said output signal varying at said relatively low frequency to provide an error signal having a null value at the maximum of the peak amplitude of the second harmonic component of the output signal while the controllable means is maintained at resonance producing condition, servo means controlled by said error signal and controlling the amplitude of said modulating signal to automatically reduce said error signal to said null value, and means for measuring the amplitude of said modulating signal to determine the concentration of said component in said sample.

4. An apparatus for quantitative analysis comprising a nuclear magnetic resonance detector having means for establishing a unidirectional field in a sample to be analyzed, controllable means for assuming a resonance-producing condition with respect to the strength of said unidirectional magnetic field for causing a component of said sample to exhibit nuclear magnetic resonance and means for producing an output signal when said component of said sample exhibits nuclear magnetic resonance, magnetic field modulating means for providing a modulating signal of a first relatively low frequency for modulating said unidirectional magnetic field to cause said component of said sample to exhibit nuclear magnetic resonance in successive cycles of said modulating signal, means for modulating said modulating signal at a second frequency, servomechanism means responsive to the component of said output signal varying at said first relatively low frequency for automatically causing said controllable means to assume said resonance-producing condition, servomechanism means responsive to the component of said output signal varying at said second frequency for controlling the amplitude of said modulating signal to automatically maintain the peak amplitude of the second harmonic component of the output signal at a maximum while the controllable means is maintained at said resonance producing condition, and means for measuring the amplitude of the modulating signal to determine the concentration of said component in said sample.

5. In combination, means for establishing a unidirectional magnetic field in a sample, controllable means for assuming a resonance-producing condition for causing the sample to exhibit nuclear magnetic resonance, means for producing an output signal when said sample exhibits nuclear magnetic resonance, modulating means providing a cyclically varying modulating signal of a first relatively low frequency for modulating said unidirectional magnetic field to cause said sample to exhibit nuclear magnetic resonance in successive cycles of said modulating signal, means for modulating said modulating signal at a second frequency, servomechanism means responsive to the component of said output signal varying at said first relatively low frequency for causing said controllable means to assume said resonance-producing condition, and second servomechanism means responsive to the component of said output signal varying at said second frequency for controlling the amplitude of said modulating signal to maintain the peak amplitude of the second harmonic component of the output signal at a maximum while said controllable means is maintained at said resonance producing condition by the first mentioned servomechanism means.

6. The method of determining moisture content which comprises applying a modulated magnetic field to a sample whose moisture content is to be determined, obtaining a nuclear magnetic resonance output signal each time the field passes through a resonance value with respect to the moisture contained in said sample, maintaining the modulating amplitude of the magnetic field at a value providing a maximum of the peak amplitude of the second harmonic component of the output signal while maintaining the steady magnetic field component at the resonance producing value, and obtaining a measure of said modulating amplitude.

7. In combination, a nuclear magnetic resonance detector having means for establishing a unidirectional magnetic field in a sample, tunable means tunable to the nuclear magnetic resonance frequency for said sample with respect to the strength of said unidirectional magnetic field, and means for producing an output signal when the sample is excited at the nuclear magnetic resonance frequency, means for automatically controlling said tunable means to maintain said tunable means tuned to said nuclear magnetic resonance frequency, magnetic field modulating means for providing a cyclically varying modulating signal for modulating said unidirectional magnetic field to cause said sample to exhibit nuclear magnetic resonance in successive cycles of said modulating signal, means for automatically controlling the amplitude of said modulating signal to maintain a component of the output signal at a predetermined value while the tunable means is maintained at resonance frequency with respect to said unidirectional magnetic field, and means for measuring the amplitude of the modulating signal.

References Cited in the file of this patent

UNITED STATES PATENTS

| 2,859,403 | Kirchner | Nov. 4, 1958 |
| 2,911,587 | Bayly | Nov. 3, 1959 |
| 2,922,947 | Bloom et al. | Jan. 26, 1960 |

FOREIGN PATENTS

| 745,873 | Great Britain | Mar. 7, 1956 |

OTHER REFERENCES

Beringer et al.: Physical Review, vol. 81, No. 1, January 1951, pp. 86 and 87 principally relied upon.

Shaw et al.: Journal of Applied Physics, vol. 26, No. 3, March 1955, pp. 313 through 317.

Staub et al.: Helvetica Physica Acta, vol. 23, pp. 63–92, 1950.